3,281,234
HERBICIDAL COMPOSITION AND METHOD
Alfred C. Whiton, Norristown, and Ivan C. Popoff, Ambler, Pa., assignors to Pennsalt Chemicals Corporation, Philadelphia, Pa., a corporation of Pennsylvania
No Drawing. Filed June 23, 1964, Ser. No. 377,379
9 Claims. (Cl. 71—2.7)

This invention relates to a process for controlling plant growth, and to herbicidal compositions containing dithiocarbamic acids as the active herbicide. In particular, the invention is concerned with the control of plant growth by use of dithiocarbamic acid derivatives having the structure

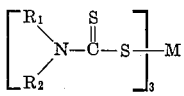

where $R_1$ and $R_2$ are butyl groups and M is a metal selected from the group consisting of arsenic and antimony.

The herbicidal compositions of the invention are useful both as pre-emergent and contact herbicides, but will preferably be used in contact herbicidal applications. In addition to the exhibiting herbicidal effects, the compositions are effective desiccants.

The compositions will be applied and formulated in the usual manner for treating plants by the usual agricultural techniques. The compositions may be used at an effective concentration which will generally range from about 1 to 40 pounds per acre; preferably the concentration used will be in the range of 2 to 20 pounds per acre, and such concentrations may be used to give weed control without damage to desirable crops. Compositions may be formulated as dispersions in water with or without wetting agents which will aid penetration of plant and soil surfaces. Instead of using aqueous systems, organic solvent systems may be employed with the active agent dispersed in the liquid carrier.

Compositions may also be prepared as concentrates containing from about 1% to about 90% by weight of active agent for dilution with water for field application. These concentrates may be prepared as aqueous dispersions in organic solvent systems, as for example, with xylene, toluene and the like, and suitable emulsifying agents may be added to obtain the dispersion of the active agent. The dithiocarbamates also lend themselves to spray or drench application and for impregnation on granular materials for use in dry application equipment. In this latter application, granules may be formulated at concentrations of from about 1% to about 50% active herbicidal ingredients. The granules containing the herbicidal agent are made readily in accordance with previously known procedures simply by spraying an aqueous or organic dispersion or solution of the active agent onto the inert carrier granules and allowing the granules to dry. Application is then made by granular applicator in accord with known methods used in commercial herbicidal applications.

The dithiocarbamates useful in this invention are, as indicated above, the antimony and arsenic salt of N,N-dibutyl dithiocarbamates. It will be understood that the butyl group may be normal, secondary or tertiary. The following examples will serve to further illustrate the invention.

*Example 1.—Preparation of antimony N,N-di-n-butyldithiocarbamate*

Antimony oxide (48.7 g., 0.167 mole), di-n-butylamine (129 g., 1.0 mole), and benzene (1 liter) were placed in a flask fitted with a reflux condenser, a sealed stirrer, a thermometer and an addition funnel. While the contents of the flask were stirred vigorously carbon disulfide (80 g., 1.05 moles) was added dropwise to the mixture over a ten-minute period from the addition funnel while permitting ice bath cooling to hold the temperature of the mass below 15° C. After the $CS_2$ had all been added, the cooling bath was removed and the mixture was allowed to warm gradually with stirring to room temperature. The slightly turbid orange-yellow solution was then heated at reflux temperature for approximately one hour, and water formed in the reaction was collected in a Dean-Stark moisture trap. At the end of the reflux period 9.0 g. of water had collected in the trap (calculated amount of $H_2O$ formed at 100% yield=9.0 g.). The benzene solution was then filtered hot and benzene was stripped from the filtrate until a slush of yellow crystals was obtained. The slush was allowed to evaporate further in a crystallizing dish, finally was spread on a sheet of aluminum foil to remove last traces of solvent. The bright yellow crystalline product weighed 237 g. (97% yield), and melted at 76–9° C.

*Example 2.—Preparation of arsenic N,N-di-n-butyldithiocarbamate*

Thirty-three grams (0.167 mole) of arsenic oxide was added to a liter of dry benzene in a glass flask equipped with a sealed stirrer, a reflux condenser, a thermometer and an addition funnel. Di-n-butylamine (129 g., 1.0 mole) was added all at once to the mixture, followed by dropwise addition with stirring of 80 g. (1.05 moles) of carbon disulfide over a ten minute period. Warming of the mixture was observed during the $CS_2$ addition, and the temperature of the mass was maintained at 10–20° C. by cooling with an ice bath. After the $CS_2$ had all been added the ice bath was removed and the mixture was stirred one hour at room temperature; by the end of this time all of the $As_2O_3$ had disappeared, and the benzene solution of the product was bright yellow and turbid due to presence of water formed in the reaction. The benzene solution was then heated under reflux for about two hours while the water present was collected in a Dean-Stark moisture trap. At the end of the reflux period 9.0 g. of water had collected in the moisture trap (calculated amount of water formed in reaction=9.0 g.). The benzene solution was then filtered hot, the filtrate was concentrated at water pump vacuum until nearly all the benzene had been stripped off, and the resulting slush of crystals was cast onto a sheet of aluminum foil where it soon hardened into a solid mass. The product was crushed and allow to air-dry for about 3 days; after it had thoroughly dried the peach-colored product weighed 222 g. (97% yield), and melted at 128–130° C.

*Example 3.—Preparation of antimony N,N-diisobutyldithiocarbamate*

Antimony oxide (48.7 g., 0.167 mole), diisobutylamine (129 g., 1.0 mole), and benzene (1 liter) were placed in a flask fitted with a sealed stirrer, a reflux condenser, a thermometer and an addition funnel. The flask was surrounded by an ice bath, and while the contents of the flask were stirred vigorously carbon disulfide (80 g., 1.05 moles) was added dropwise to the mixture from the addition funnel during ten minutes (temperature of the mass remained below 10° C.). The cooling bath was then removed, and the mixture was stirred an additional two hours; during this period the temperature of the reaction mixture rose gradually to about 30° C., and most of the $Sb_2O_3$ disappeared. The turbid yellow mixture was then heated at reflux temperature for approximately one hour, and the water formed in the reaction was collected in a Dean-Stark moisture trap (8.3 g. $H_2O$ collected; 9.0 g. $H_2O$ is the calculated amount formed at 100% yield). A positive test for hydrogen sulfide was obtained at the top of the condenser throughout the reflux period. Following this heating period the mixture was filtered hot, and benzene was stripped from the filtrate until a very slushy residue was obtained. This slush of yellow crystals was set out to evaporate further in a crystallizing dish, finally was spread on a sheet of aluminum foil until all the solvent was removed. The final product, light yellow crystals, weighed 213 g. (88% yield), and melted at 108–111° C.

Evaluation of the products was carried out by standard techniques. For pre-emergent tests, a soil surface in flats was sprayed with a formulation of the agent and then weed and crop seeds were planted in the treated soil. The flats were held in a greenhouse and visual observation made on the growth of weeds and crops. For contact herbicidal applications (e.g. post-emergent) weeds growing in flats were sprayed with formulations of the agent and visual observation made over a period of time.

*Example 4*

The aqueous emulsion of a 5% by weight formulation of antimony N,N-diisobutyldithiocarbamate in xylene was evaluated at 10 pounds per acre under post-emergent conditions and showed 90% to 100% kill of crabgrass, foxtail, lamb's-quarter, pigweed and purslane. At five pounds per acre 80% to 100% control of crabgrass, foxtail and lamb's-quarter was demonstrated.

*Example 5*

Under pre-emergent test conditions the aqueous emulsion of a 5% by weight formulation of antimony N,N-di-n-butyldithiocarbamate in isophorone applied at 10 pounds per acre gave 80% kill of lamb's-quarter, 70% kill of purslane and amaranthus, and 60% kill of crabgrass. Sugar beet crops were essentially unaffected.

Under contact test conditions, the agent gave 75% kill of crabgrass and 90% kill of foxtail.

When antimony N-n-butyldithiocarbamate (e.g. the monobutyl derivative) was similarly evaluated at 10 pounds per acre, no contact weed kill was observed and under pre-emergent testing conditions 0% to 20% kill of weeds was obtained. Thus, only the N,N-dibutyl dithiocarbamates as described above are active herbicides in this invention.

*Example 6*

When an aqueous emulsion of a formulation of arsenic N,N-di-n-butyldithiocarbamate in xylene was evaluated under post-emergent conditions at 5, 7.5 and 10 pounds per acre against crabgrass, foxtail and lamb's-quarter, fair to good weed control was obtained.

When an aqueous emulsion of a formulation of arsenic N,N-di-n-butyldithiocarbamate in a mixture of isophorone and acetone was sprayed on green bean plants at a rate of 5 pounds per acre, 100% desiccation was obtained and slight desiccation on cotton was observed.

It will be understood that numerous changes and variations may be made from the above description and examples without departing from the spirit and scope of the invention.

We claim:

1. The method of affecting plant growth which comprises contacting plants with a plant growth affecting amount of a compound of structure

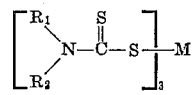

where $R_1$ and $R_2$ are butyl and M is selected from the group consisting of arsenic and antimony.

2. The method of claim 1 wherein the active agent is an arsenic N,N-dibutyldithiocarbamate.

3. The method of claim 1 wherein the active agent is an antimony N,N-dibutyldithiocarbamate.

4. The method of claim 1 wherein the active agent is antimony N,N-di-n-butyldithiocarbamate.

5. The method of claim 1 wherein the active agent is antimony N,N-di-n-butyldithiocarbamate.

6. A composition comprising a carrier and a herbicidally active amount of a metal N,N-dibutyldithiocarbamate wherein said metal is selected from the group consisting of antimony and arsenic.

7. A composition as in claim 6 wherein the active agent is antimony N,N-di-isobutyldithiocarbamate.

8. A composition as in claim 6 wherein the active agent is antimony N,N-di-n-butyldithiocarbamate.

9. A composition as in claim 6 wherein the active agent is an arsenic N,N-dibutyldithiocarbamate.

No references cited.

LEWIS GOTTS, *Primary Examiner.*